US012770516B2

(12) United States Patent
Hayashi et al.

(10) Patent No.: US 12,770,516 B2
(45) Date of Patent: Oct. 20, 2026

(54) DISPLAY CONTROL DEVICE, DISPLAY CONTROL METHOD, AND DISPLAY CONTROL PROGRAM

(71) Applicant: NTT, Inc., Tokyo (JP)

(72) Inventors: Aki Hayashi, Tokyo (JP); Yuki Yokohata, Tokyo (JP); Takahiro Hata, Tokyo (JP); Kazuaki Obana, Tokyo (JP)

(73) Assignee: NTT, Inc., Tokyo (JP)

( * ) Notice: Subject to any disclaimer, the term of this patent is extended or adjusted under 35 U.S.C. 154(b) by 358 days.

(21) Appl. No.: 18/566,637

(22) PCT Filed: Jun. 11, 2021

(86) PCT No.: PCT/JP2021/022380
§ 371 (c)(1),
(2) Date: Dec. 2, 2023

(87) PCT Pub. No.: WO2022/259542
PCT Pub. Date: Dec. 15, 2022

(65) Prior Publication Data

US 2024/0371307 A1 Nov. 7, 2024

(51) Int. Cl.
*G08G 1/00* (2006.01)
*G08G 1/01* (2006.01)

(52) U.S. Cl.
CPC ........... *G08G 1/205* (2013.01); *G08G 1/0133* (2013.01); *G08G 1/0141* (2013.01)

(58) Field of Classification Search
CPC ............... G08G 1/0133; G08G 1/0141; G08G 1/0145; G08G 1/205; G08G 1/207; G08G 1/0112
See application file for complete search history.

(56) References Cited

U.S. PATENT DOCUMENTS

| | | | | |
|---|---|---|---|---|
| 11,055,624 | B1 * | 7/2021 | Sapp | G06N 7/01 |
| 2012/0262472 | A1 * | 10/2012 | Garr | G06T 11/206 345/589 |
| 2014/0172174 | A1 * | 6/2014 | Poss | G05B 15/02 700/275 |
| 2015/0242772 | A1 * | 8/2015 | Backof, II | G06Q 10/0631 705/7.12 |

(Continued)

FOREIGN PATENT DOCUMENTS

| | | | |
|---|---|---|---|
| JP | 2019185097 | A | 10/2019 |
| WO | 2021009819 | A1 | 1/2021 |

OTHER PUBLICATIONS

"Box plot" Wikipedia "free encyclopedia" [online] Accessed on May 28, 2021, website: <URL: https://ja.wikipedia.org/wiki/%E7%AE%B1%E3%81%B2%E3%81%92%E5%9B%B3>.

*Primary Examiner* — Keith D Bloomquist

(57) ABSTRACT

An acquisition unit (22) acquires a value corresponding to the number of aggregation targets that are present, the number being collected in a predetermined time unit for each region obtained by virtually dividing a real space, a calculation unit (24) calculates each of three different indexes from the acquired value, and a control unit (26) displays, on a display unit, a visualized image in which a pixel value obtained by associating the three indexes calculated with three elements of a color space, respectively, is set as a pixel value indicating the region.

8 Claims, 13 Drawing Sheets

(56) References Cited

U.S. PATENT DOCUMENTS

| | | | | |
|---|---|---|---|---|
| 2017/0228899 | A1* | 8/2017 | Witriol | G06T 11/001 |
| 2018/0101969 | A1* | 4/2018 | Garramone | G06T 11/206 |
| 2019/0220969 | A1* | 7/2019 | Miki | G06N 20/00 |
| 2020/0357117 | A1* | 11/2020 | Lyman | G06T 7/0012 |
| 2021/0025141 | A1* | 1/2021 | Hamada | G06N 20/00 |
| 2021/0103877 | A1* | 4/2021 | DaCosta | G08G 5/55 |
| 2021/0390677 | A1* | 12/2021 | Do | G06T 11/60 |
| 2022/0319377 | A1* | 10/2022 | Yagi | G09G 3/2003 |

* cited by examiner

Fig. 4

ENTIRE PERIOD

| | μ | σ | ω |
|---|---|---|---|
| ENTIRETY | 5.5 | 1.2 | 1.0 |

EVERY DAY OF WEEK

| | μ | σ | ω |
|---|---|---|---|
| MONDAY | 10.3 | 2.3 | 0.2 |
| TUESDAY | 7.2 | 1.4 | 0.2 |
| : | : | : | : |
| SUNDAY | 0.1 | 0.2 | 0.05 |

EVERY TIME SLOT

| | μ | σ | ω |
|---|---|---|---|
| 0:00 | 0.2 | 0.1 | 0.05 |
| 1:00 | 0.1 | 0.1 | 0.05 |
| : | : | : | : |
| 23:00 | 2.5 | 0.7 | 0.1 |

EVERY DAY OF WEEK AND EVERY TIME SLOT

| | μ | σ | ω |
|---|---|---|---|
| MONDAY 0:00 | 0.2 | 0.1 | 0.08 |
| MONDAY 1:00 | 1.1 | 0.5 | 0.07 |
| : | : | : | : |
| SUNDAY 23:00 | 0.3 | 0.2 | 0.01 |

TIME GRANULARITY IS COARSER ⟷ TIME GRANULARITY IS FINER

VISUALIZED IMAGES OF MESHES EXTRACTED BY CONDITION 2

DISPLAY CONTROL DEVICE, DISPLAY CONTROL METHOD, AND DISPLAY CONTROL PROGRAM

CROSS-REFERENCE TO RELATED APPLICATIONS

This application is a U.S. 371 Application of International Patent Application No. PCT/JP2021/022380, filed on 11 Jun. 2021, the disclosure of which is hereby incorporated herein by reference in its entirety.

TECHNICAL FIELD

The disclosed technology relates to a display control device, a display control method, and a display control program.

BACKGROUND ART

For observation, analysis, and the like of collected data, a plurality of different indexes related to data is simultaneously visualized. The most orthodox method of this visualization is a box plot that represents a plurality of statistics about data in one diagram.

CITATION LIST

Non Patent Literature

Non Patent Literature 1: "Box plot", [online], free encyclopedia "Wikipedia", [searched on May 28, 2021], Internet <URL: https://ja.wikipedia.org/wiki/%E7%AE%B1%E3%81%B2%E3%81%92%E5%9B%B3>

SUMMARY OF INVENTION

Technical Problem

However, in a method of simultaneously visualizing a plurality of different indexes related to data using a box plot, in a case where the number of data to be compared is large, a large number of box plots are arranged on the same screen, and it may be difficult for a person to visually recognize and perform observation, analysis, and the like.

The disclosed technology has been made in view of the above points, and an object thereof is to visualize a plurality of indexes in a simultaneously comparable manner for spatially divided data.

Solution to Problem

A first aspect of the present disclosure is a display control device including an acquisition unit that acquires a value corresponding to a number of aggregation targets that are present, the number being collected in a predetermined time unit for each of a plurality of regions obtained by virtually dividing a real space, a calculation unit that calculates each of three different indexes from the value acquired by the acquisition unit, and a control unit that displays, on a display unit, a visualized image in which a pixel value obtained by associating the three indexes calculated by the calculation unit with three elements of a color space, respectively, is set as a pixel value indicating the region.

A second aspect of the present disclosure is a display control method including, by an acquisition unit, acquiring a value corresponding to a number of aggregation targets that are present, the number being collected in a predetermined time unit for each of a plurality of regions obtained by virtually dividing a real space, by a calculation unit, calculating each of three different indexes from the value acquired by the acquisition unit, and by a control unit, displaying, on a display unit, a visualized image in which a pixel value obtained by associating the three indexes calculated by the calculation unit with three elements of a color space, respectively, is set as a pixel value indicating the region.

A third aspect of the present disclosure is a display control program for causing a computer to function as an acquisition unit that acquires a value corresponding to a number of aggregation targets that are present, the number being collected in a predetermined time unit for each of a plurality of regions obtained by virtually dividing a real space, a calculation unit that calculates each of three different indexes from the value acquired by the acquisition unit, and a control unit that displays, on a display unit, a visualized image in which a pixel value obtained by associating the three indexes calculated by the calculation unit with three elements of a color space, respectively, is set as a pixel value indicating the region.

Advantageous Effects of Invention

According to the disclosed technology, a plurality of indexes can be visualized in a simultaneously comparable manner for spatially divided data.

BRIEF DESCRIPTION OF DRAWINGS

FIG. 4 is a diagram for describing calculation of an average, a standard deviation, and time axis reliability.

DESCRIPTION OF EMBODIMENTS

Figure 1:
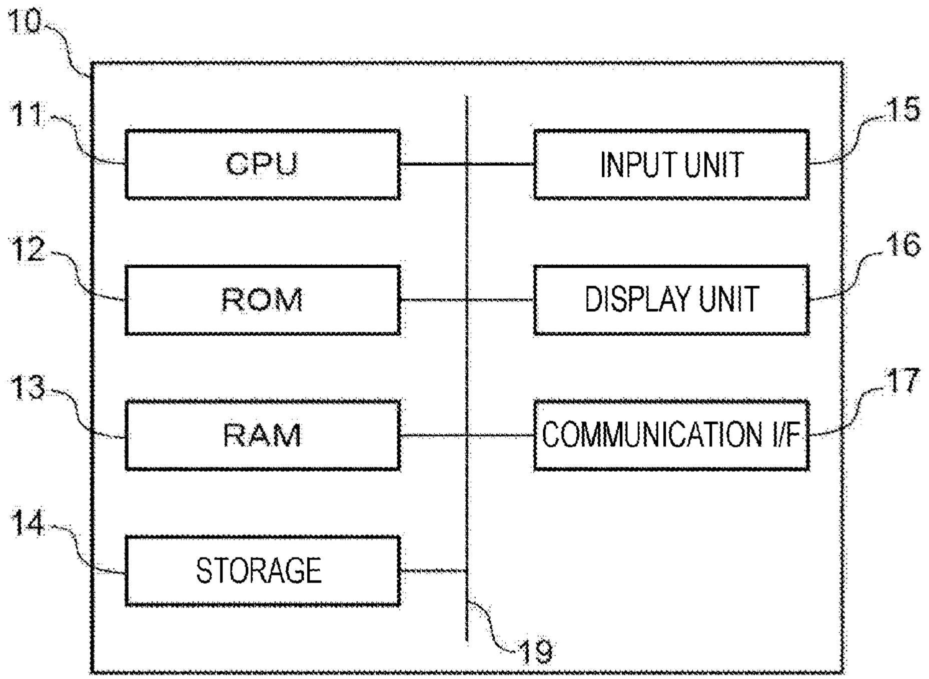
FIG. 1 is a block diagram illustrating a hardware configuration of a display control device.

Hereinafter, an example of an embodiment of the disclosed technology will be described with reference to the drawings. Note that, in the drawings, the same or equivalent components and portions are denoted by the same reference signs. Further, dimensional ratios in the drawings are exaggerated for convenience of description, and may be different from actual ratios.

In the present embodiment, an example will be described in which a display control device of the disclosed technology is applied in a case of visualizing aggregation results regarding a traffic volume for each place in order to examine congestion avoidance measures and the like on the basis of data regarding the traffic volume.

FIG. 1 is a block diagram illustrating a hardware configuration of a display control device 10 according to the present embodiment. As illustrated in FIG. 1, the display control device 10 includes a central processing unit (CPU) 11, a read only memory (ROM) 12, a random access memory (RAM) 13, a storage 14, an input unit 15, a display unit 16, and a communication interface (I/F) 17. The configurations are connected to each other to be able to communicate via a bus 19.

The CPU 11 is a central processing unit that executes various programs and controls each unit. That is, the CPU 11 reads a program from the ROM 12 or the storage 14 and executes the program using the RAM 13 as a working area. The CPU 11 controls each of the foregoing configurations and executes various calculation processes according to the program stored in the ROM 12 or the storage 14. In the present embodiment, the ROM 12 or the storage 14 stores a display control program for executing a display control process to be described later.

The ROM 12 stores various programs and various types of data. The RAM 13 temporarily stores a program or data as a working area. The storage 14 includes a storage device such as a hard disk drive (HDD) or a solid state drive (SSD), and stores various programs including an operating system and various data.

The input unit 15 includes pointing devices such as a mouse and a keyboard and is used to execute various inputs. The display unit 16 is, for example, a liquid crystal display, and displays various types of information. The display unit 16 may function as the input unit 15 by employing a touchscreen system. The communication I/F 17 is an interface for communicating with other devices. For the communication, for example, a wired communication standard such as Ethernet (registered trademark) or FDDI or a wireless communication standard such as 4G, 5G, or Wi-Fi (registered trademark) is used.

Figure 2:
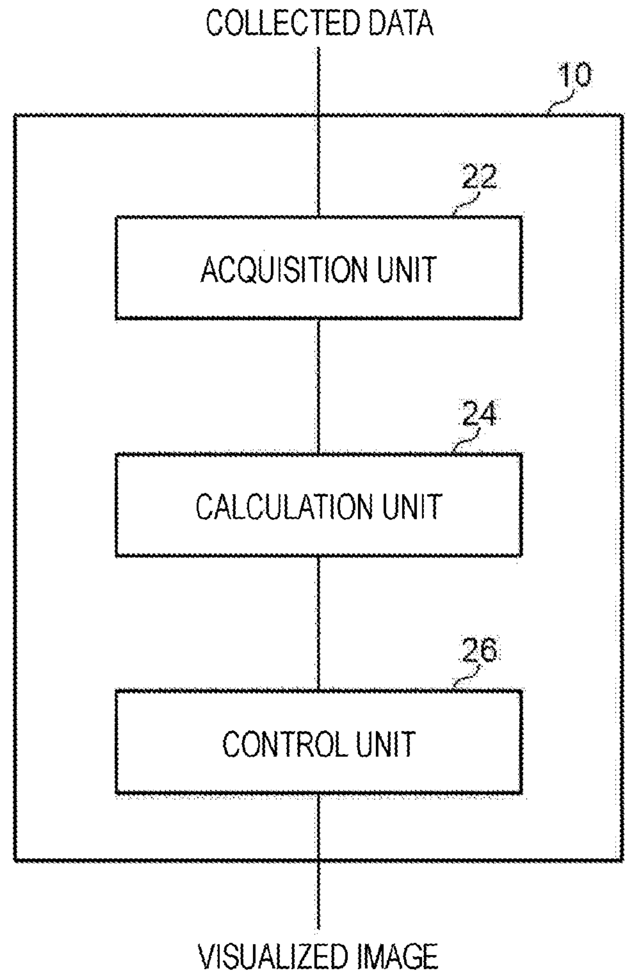
FIG. 2 is a block diagram illustrating an example of a functional configuration of the display control device.

Next, a functional configuration of the display control device 10 will be described. FIG. 2 is a block diagram illustrating an example of a functional configuration of the display control device 10. As illustrated in FIG. 2, the display control device 10 includes an acquisition unit 22, a calculation unit 24, and a control unit 26 as a functional configuration. Each functional configuration is achieved by the CPU 11 reading the display control program stored in the ROM 12 or the storage 14, loading the display control program to the RAM 13, and executing the display control program.

The acquisition unit 22 acquires a value corresponding to the number of aggregation targets present, the number being collected in a predetermined time unit (hereinafter, referred to as "collection unit") for each region obtained by virtually dividing a real space. In the present embodiment, the region obtained by virtually dividing the real space is a rectangular region of the real space corresponding to each mesh of Geohash obtained by dividing a map into grids. Further, the aggregation target is a vehicle that has passed through the rectangular region of the real space corresponding to each mesh, and the number of aggregation targets present is the number of vehicles in every collection unit that have passed through the rectangular region. In addition, the value corresponding to the number may be the number of vehicles itself, or may be a smoothed number, an estimated number, or the like.

Figure 3:
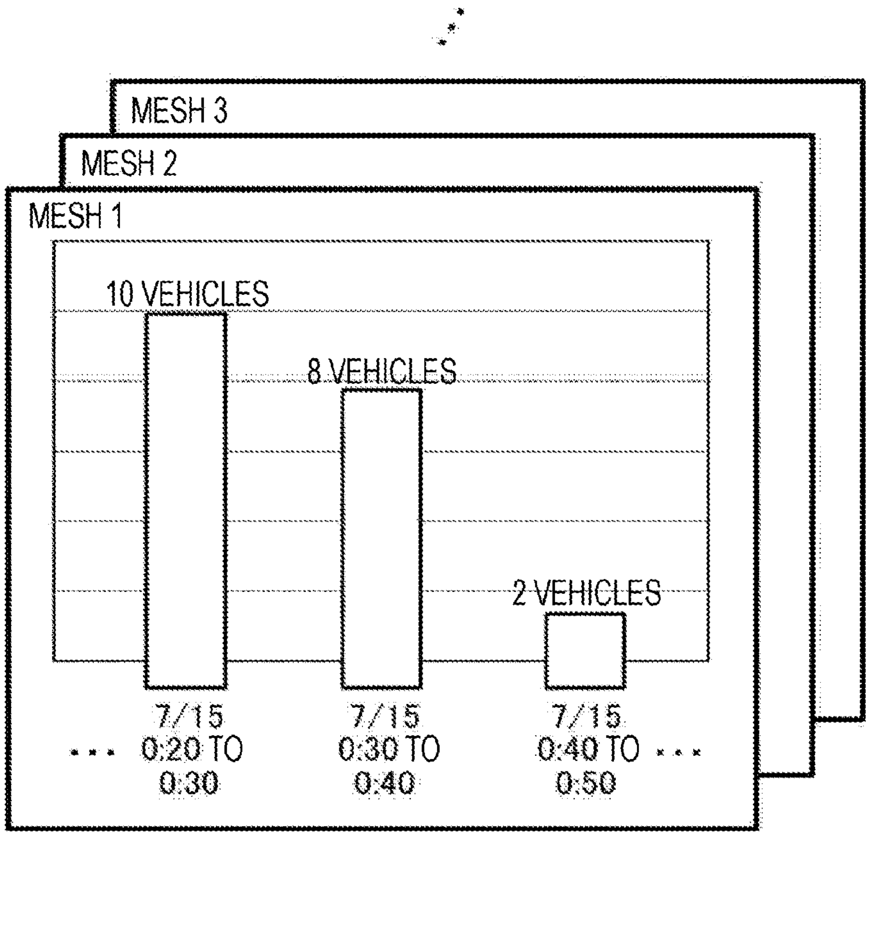
FIG. 3 is a schematic diagram illustrating an example of collected data.

Specifically, the acquisition unit 22 acquires collected data input to the display control device 10. As illustrated in FIG. 3, the collected data is data obtained by collecting the number of vehicles that have passed through a rectangular region of the real space corresponding to each mesh in each collection unit (in an example of FIG. 3, in units of 10 minutes), and is data in which the date and time for defining the collection unit and the number of vehicles are associated with each other for each mesh. The collected data is collected by, for example, acquiring position information from a connected car, and recording the acquired position information and acquisition date and time in association with information (for example, latitude and longitude) specifying a range of a rectangular region of a real space corresponding to a mesh. The acquisition unit 22 passes the acquired collected data to the calculation unit 24.

The calculation unit 24 calculates each of three different indexes from the collected data delivered from the acquisition unit 22. The calculation unit 24 calculates, as the three indexes, a first statistic, a second statistic, and reliability of at least one of the first statistic or the second statistic or the aggregate value itself in the time slot of interest. In the present embodiment, as an example, the calculation unit 24 calculates an average $\mu$ of collected data for each of four time axes (details will be described later) as the first statistic, a standard deviation $\sigma$ as the second statistic, and time axis reliability (details will be described later) as the reliability.

The time axis is a time granularity when each index is calculated. In the present embodiment, four time axes are set for an entire period, every day of week, every time slot, and every day of week and time slot of the collected data. Note that this time axis is an example, and another time axis may be set, such as setting a time axis of every month for collected data for one year. Therefore, the calculation unit 24 calculates the average $\mu$, the standard deviation $\sigma$, and the time axis reliability $\omega$ as illustrated in FIG. 4 by aggregating the collected data for every aggregation unit of the time axis for each of the four time axes of the entire period, every day of the week, every time slot, and every day of the week and time slot.

The aggregation unit in a case where the time axis is the entire period is the entire period of the acquired collected data. The repetition cycle is not fixed, but it is effective for detecting an increase or decrease in the aggregate value that frequently occurs. The aggregation unit in a case where the time axis is every day of the week is each day of the week of Monday, Tuesday, . . . , and Sunday. The aggregation unit in a case where the time axis is every time slot is each time slot of time slot 1, time slot 2, . . . , and time slot N in a case where one day is divided into N time slots. The aggregation unit in a case where the time axis is the day of week and the time slot is each day of the week and each time slot of time slot 1 of Monday, time slot 2 of Monday, . . . , and time slot N of Sunday.

Note that, in the example of FIG. 4, in a case where the time axis is every time slot, as an example, 24 time slots obtained by dividing one day (from 0:00 to 24:00) by every hour are set, and "0:00" represents 0:00 (0:00 to 0:59). In this example, as illustrated in FIG. 4, the time granularity of the aggregation unit in the entire period is the coarsest, and the time granularity gradually becomes finer in the order of every day of the week, every time slot, and every day of the week and time slot.

Specifically, the calculation unit 24 calculates the total average μ, the standard deviation σ, and the time axis reliability ω of the entirety from the number of vehicles in every collection unit included in the entire period of the collected data. Further, the calculation unit 24 classifies the number of vehicles in every collection unit included in the entire period of the collected data for every day of the week, and calculates the average μ, the standard deviation σ, and the time axis reliability ω for every day of the week from the number of vehicles in every collection unit for every day of the week. Furthermore, the calculation unit 24 classifies the number of vehicles in every collection unit included in the entire period of the collected data for every time slot, and calculates the average μ, the standard deviation σ, and the time axis reliability ω for every time slot from the number of vehicles in every collection unit for each time slot. Further, the calculation unit 24 classifies the number of vehicles in every collection unit included in the entire period of the collected data for every day of the week and time slot, and calculates the average μ, the standard deviation σ, and the time axis reliability ω for every day of the week and every time slot from the number of vehicles in every collection unit for every day of the week and time slot.

The time axis reliability ω is an index representing a relative value in all meshes of the number of times of aggregation when the average μ and the standard deviation σ are calculated from the collected data. Here, the number of times of aggregation is the number of collection units in which the number of vehicles equal to or more than a threshold is recorded. As described above, in a case where collected data is collected by using position information of a connected car or the like, in a situation where the penetration rate of the connected car is insufficient (for example, about 20 to 30%), there may be a case where collected data sufficient for grasping the degree of congestion or the like has not been collected. For example, for the mesh A, it is assumed that collected data in which the number of vehicles equal to or more than the threshold is recorded is acquired in each collection unit of 0:30 to 0:40, 0:40 to 0:50, and 0:50 to 1:00. On the other hand, for the mesh B, it is assumed that the collected data in which the number of vehicles equal to or more than the threshold is recorded is acquired only once in 0:40 to 0:50 among the three collection units. In this case, in the mesh B, it is not possible to determine whether congestion has not actually occurred, or it is not possible, although congestion has actually occurred, to determine whether there is no connected car present in the collection units of 0:30 to 0:40 and 0:50 to 1:00. Accordingly, in the present embodiment, the number of collection units in which the number of vehicles equal to or more than the threshold is recorded in the collected data is defined as the number of times of aggregation and used for calculation of the time axis reliability.

Hereinafter, a case where one is set as the threshold, that is, a case where the number of collection units in which the number of vehicles of one or more is recorded is counted as the number of times of aggregation will be specifically described as an example.

The calculation unit 24 normalizes the number of times of aggregation for every aggregation unit on each time axis, and calculates the time axis reliability ω. For example, the calculation unit 24 calculates the time axis reliability ω by the following Equation (1).

$$\omega(T,t)=N(T,t)/\max N(T,t) \tag{1}$$

Here, T is the type of time axis (the entire period, every day of the week, every time slot, and every day of the week and time slot), and t is the aggregation unit (for example, all, Monday, around 1:00, Monday and around 1:00, and the like). Therefore, ω(T, t) is the time axis reliability for an aggregation unit t of a time axis T. N(T, t) is the number of times of aggregation for the aggregation unit t on the time axis T in each mesh. Further, maxN(T, t) is the number of times of aggregation for a mesh having the largest number of times of aggregation among the numbers of times of aggregation for meshes for the aggregation unit t on the time axis T. Thus, ω(T, t) expressed in Equation (1) is an index indicating how large the number of times of aggregation for the aggregation unit t on the time axis T of each mesh is as compared with the number of times of aggregation in other meshes for the aggregation unit t on the same time axis T. For example, for T=time slot and t=13:00, in a case where the number of times of aggregation in the mesh A is 30 times, and the number of times of aggregation of the mesh B, which is the maximum number of times of aggregation among all the meshes, is 500 times, the value of ω(time slot, 13:00) for the mesh A is 30/500.

In addition, how large the number of times of aggregation is to make the calculated average μ and standard deviation σ reliable values differ depending on the time axis, aggregation unit, data collection period, and the like. Specifically, in a case of T=every day of the week, the aggregation unit t has 7 stages from Monday to Sunday, and in a case of T=every day of the week and time slot, the aggregation unit t has 168 stages of 7×24, and the number of collection units classified into each stage is greatly different. In addition, it is assumed that there are many meshes in which the number of times of aggregation greatly differs between midnight and daytime, between weekdays and holidays, and the like. Accordingly, as in the above Equation (1), by normalizing the number of times of aggregation using MaxN(T, t), the appropriate time axis reliability ω can be calculated.

Note that, in a case of acquiring collected data of a type in which there is no uncertainty in the collected data itself without being affected by the low penetration rate of the connected car or the like as described above, another index may be applied as the time axis reliability. For example, the degree of influence on each time axis (index using normalized mutual information amount based on result prediction accuracy for each time axis) described in JP 2016-91040 A may be applied as the time axis reliability.

The calculation unit 24 passes the average μ, the standard deviation σ, and the time axis reliability ω for every aggregation unit of each time axis calculated for each mesh to the control unit 26. Note that, in the following description, each of the average and the standard deviation for the aggregation unit t on the time axis T is also referred to as μ(T, t) and σ(T, t), similarly to ω(T, t) in the above Equation (1).

Figure 5:
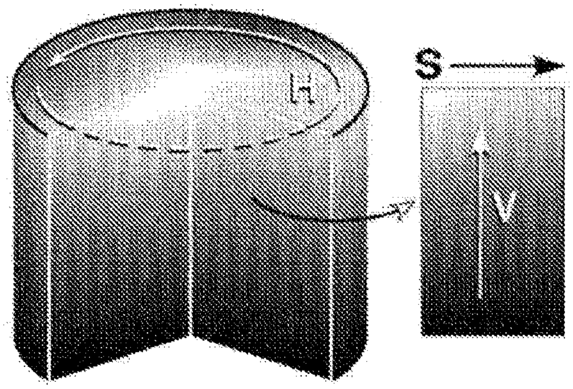
FIG. 5 is a diagram for describing hue (H), saturation (S), and brightness (V).

The control unit 26 displays, on the display unit 16, a visualized image in which a pixel value obtained by associating the average μ, the standard deviation σ, and the time axis reliability ω for every aggregation unit on each time axis for each mesh delivered from the calculation unit 24 with the three elements of the color space, respectively, is set as the pixel value indicating each mesh. For example, the control unit 26 specifies, using an HSV color space, a pixel value including hue (H) according to a value of μ(T, t), saturation (S) according to a value of σ(T, t), and brightness (V) according to a value of ω(T, t). As illustrated in FIG. 5, the hue (H), the saturation (S), and the brightness (V) correspond to three orthogonal axes, and the pixel value (color) is uniquely determined by determining respective values of the hue (H), the saturation (S), and the brightness (V). Note that the color space to be applied is not limited to the HSV color space, and another color space such as YCbCr may be applied.

Specifically, the control unit 26 assigns the minimum value to the maximum value of μ(T, t) in all the meshes to a predetermined range of values of the hue (H). Then, the control unit 26 linearly interpolates the relationship between the value of the hue (H) and the value of μ(T, t) between the minimum value and the maximum value, and specifies the value of the hue (H) according to each μ(T, t). Similarly, the control unit 26 assigns from the minimum value to the maximum value of σ(T, t) in all meshes to a predetermined range of values of the saturation (S), and specifies the value of the saturation (S) according to each σ(T, t). Similarly, the control unit 26 assigns from the minimum value to the maximum value of ω(T, t) in all meshes to a predetermined range of values of the brightness (V), and specifies the value of the brightness (V) according to each ω(T, t). As the predetermined range of values for each of the hue (H), the saturation (S), and the brightness (V), it is sufficient if a range in which the visibility of the color of each mesh in the displayed visualized image is ensured is determined.

Figure 6:
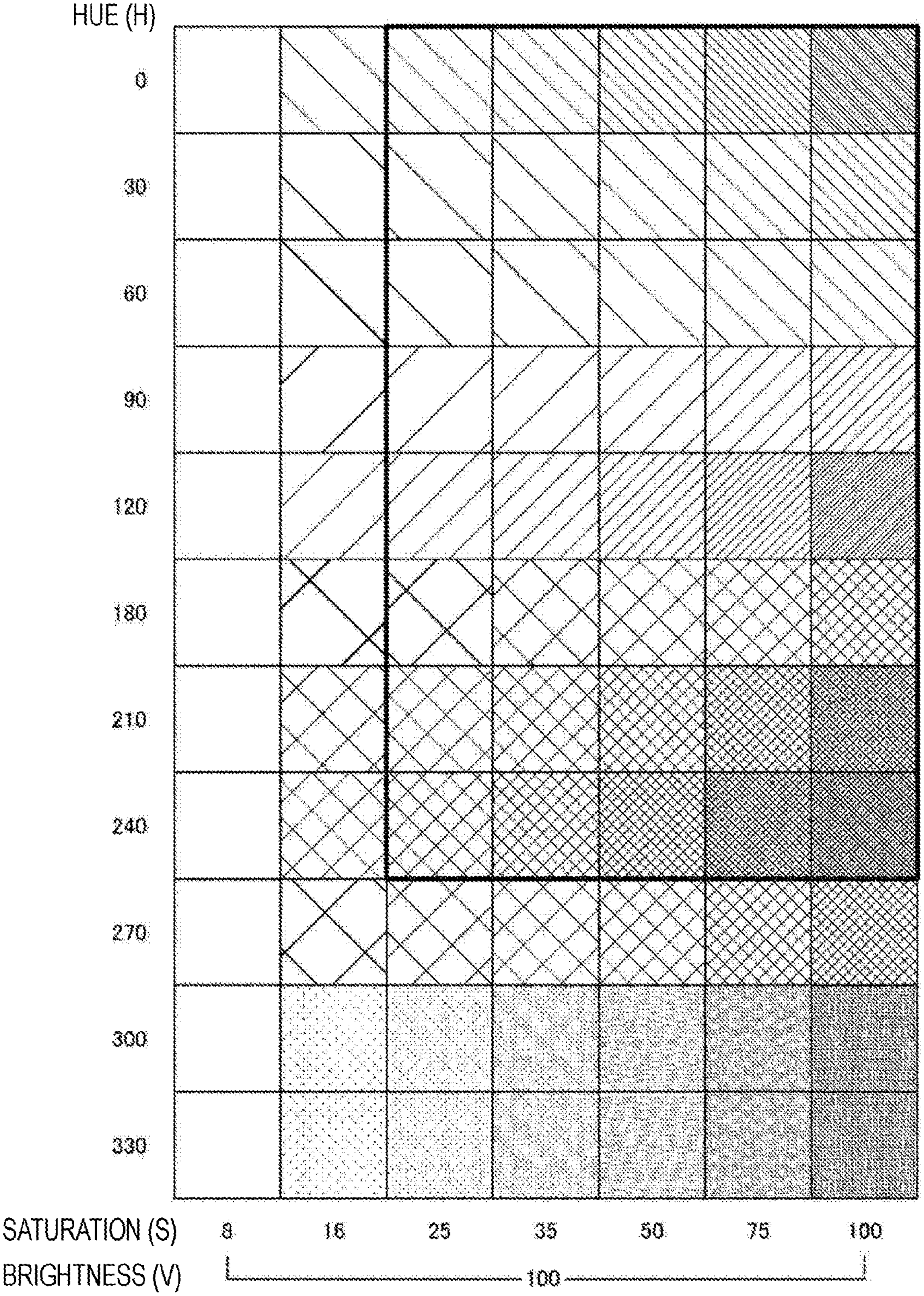
FIG. 6 is a diagram illustrating a relationship between hue (H) and saturation (S) in a case where a value of brightness (V) is fixed at 100.

FIG. 6 illustrates the relationship between the hue (H) and the saturation (S) in a case where the value of the brightness (V) is fixed at 100. Note that, in FIG. 6, the difference between the hue (H) and the saturation (S) is represented by the difference in hatching. The same applies to the drawings described later, including the difference in brightness (V). For example, as in the range indicated by a thick line frame in FIG. 6, the range of the hue (H) to be used may be determined as 0 to 240, and the range of the saturation (S) to be used may be determined as 20 to 100. Further, the range of the brightness (V) to be used may be determined as 40 to 100. This range may be set, for example, by displaying a slide bar on the display unit 16 and operating the slide bar by the user. Further, the saturation (S) and the brightness (V) may be binarized by threshold processing. In addition, this threshold may also be set by the user operating the slide bar.

For example, in the range of the hue (H) as described above, the control unit 26 may assign the maximum value of μ(T, t) in all the meshes to H=0) and the minimum value to H=240. In addition, for example, the control unit 26 may assign the maximum value of σ(T, t) in all the meshes to S=20 and the minimum value to S=100 so that the larger the standard deviation, that is, the larger the variation in the collected data, the duller the appearance. Furthermore, for example, the control unit 26 may assign the minimum value of ω(T, t) in all the meshes to V=40 and the maximum value to V=100 so that the lower the time axis reliability, the darker the appearance. Hereinafter, the specified pixel value is also referred to as HSV (T, t).

The control unit 26 further divides the inside of the mesh into a plurality of cells (small regions), and performs control so that a visualized image in which cells corresponding to aggregation units on respective time axes are colored with colors indicated by a pixel value specified for the aggregation units on the respective time axes is displayed on the display unit 16. Specifically, the control unit 26 divides each mesh into a matrix, and associates a time axis for every day of the week with one of a row and a column of the matrix and a time axis for every time slot with the other. Then, the control unit 26 colors the cell with the color indicated by the pixel value HSV (T, t) according to the time axis corresponding to the row and column to which each cell belongs.

Figure 7:
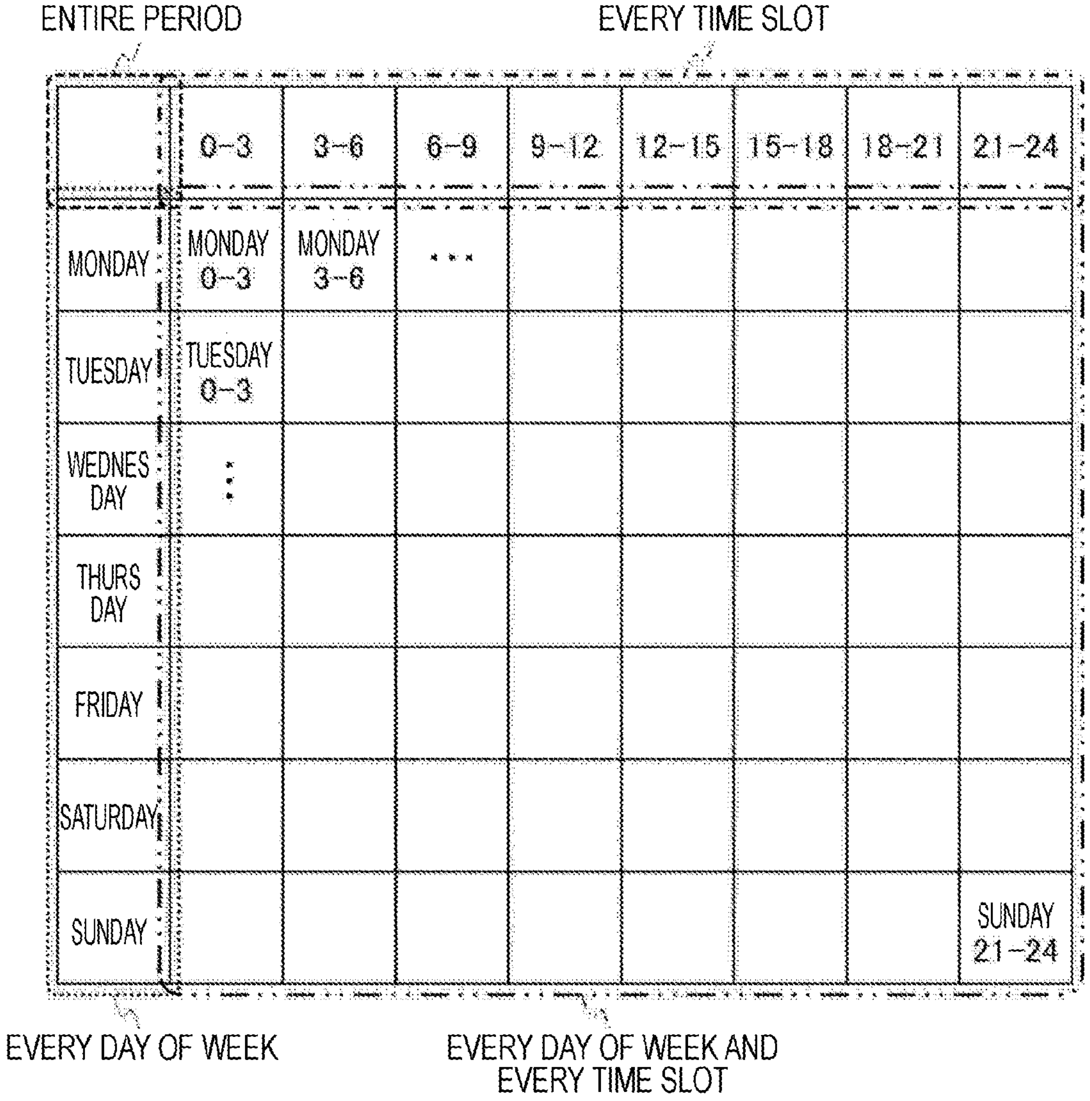
FIG. 7 is a diagram illustrating an example of a matrix obtained by dividing an inside of a mesh.

For example, in a case where a time slot obtained by dividing one day every three hours is set, the inside of the mesh is divided into each cell of a matrix of 8 rows×9 columns as illustrated in FIG. 7. In this case, the cells in the first row and the first column of the matrix (broken line portion in FIG. 7) are colored with the color indicated by the pixel value HSV (entire period). Further, cells in the first column and the second to eighth rows of the matrix (dotted line portion in FIG. 7) are colored with colors each indicated by HSV (every day of the week, Monday), HSV (every day of the week, Tuesday), . . . , and HSV (every day of the week, Sunday). Furthermore, cells in the first row and the second to ninth columns of the matrix (the one-dot chain line portion in FIG. 7) are colored with colors each indicated by HSV (every time slot, 0:00 to 3:00), HSV (every time slot, 3:00 to 6:00), . . . , and HSV (every time slot, 21:00 to 24:00). In addition, the other cells of the matrix (two-dot chain line portion in FIG. 7) are colored with colors each indicated by HSV (every day of the week and time slot, X) specified by the combination X of the day of the week corresponding to the row of the cell and the time slot corresponding to the column of the cell. X is Monday, 0:00 to 3:00, Monday, 3:00 to 6:00, . . . , Tuesday, 0:00 to 3:00, . . . , Sunday, and 21:00 to 24:00.

Figure 8:
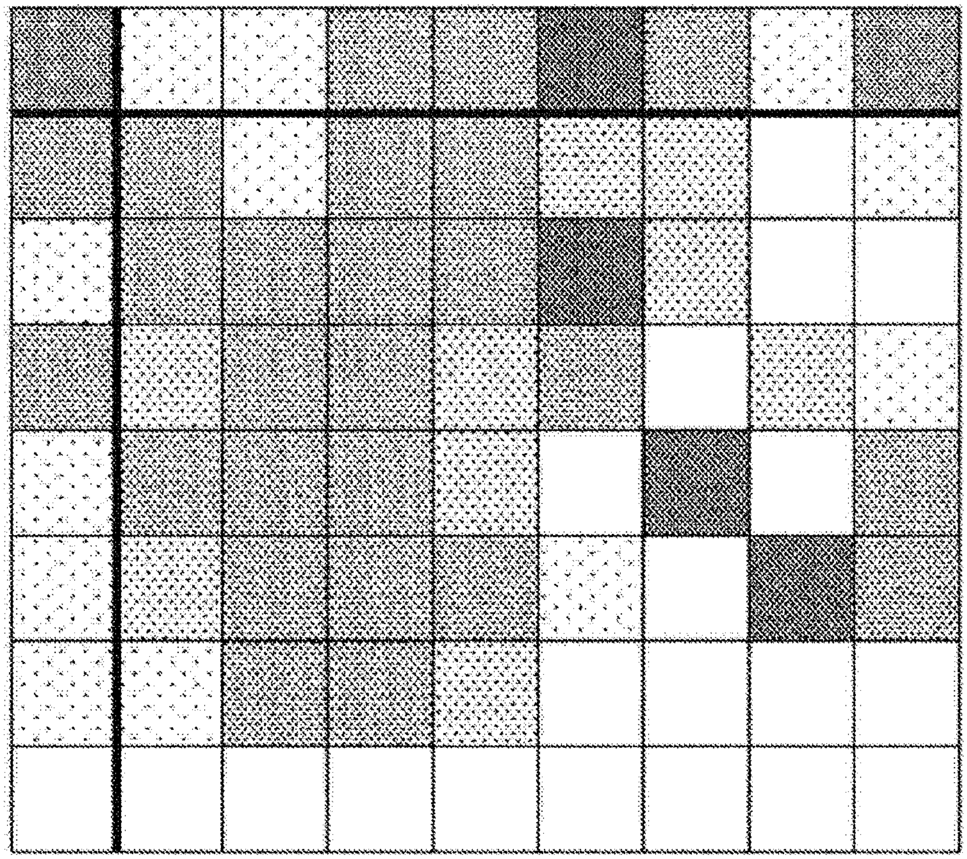
FIG. 8 is a schematic diagram illustrating an example of visualized images in which each cell of a matrix is colored.

Note that, in a case where the aggregation unit for every time is a time slot divided by hour as illustrated in FIG. 4 and the time slots of the matrix are time slots divided by three hours as illustrated in FIG. 7, it is sufficient if HSV(T, t) is specified from the average of μ(T, t), σ(T, t), and ω(T, t) for three hours. FIG. 8 illustrates an example of a matrix in which each cell is colored with the color indicated by the corresponding HSV(T, t). In FIG. 8, boundaries of regions on the matrix corresponding to different time axes are represented by thick lines. The same applies to FIGS. 10 to 12 described later.

Figure 9:
FIG. 9 is a display example in which visualized images of meshes are superimposed on a map.
Figure 10:
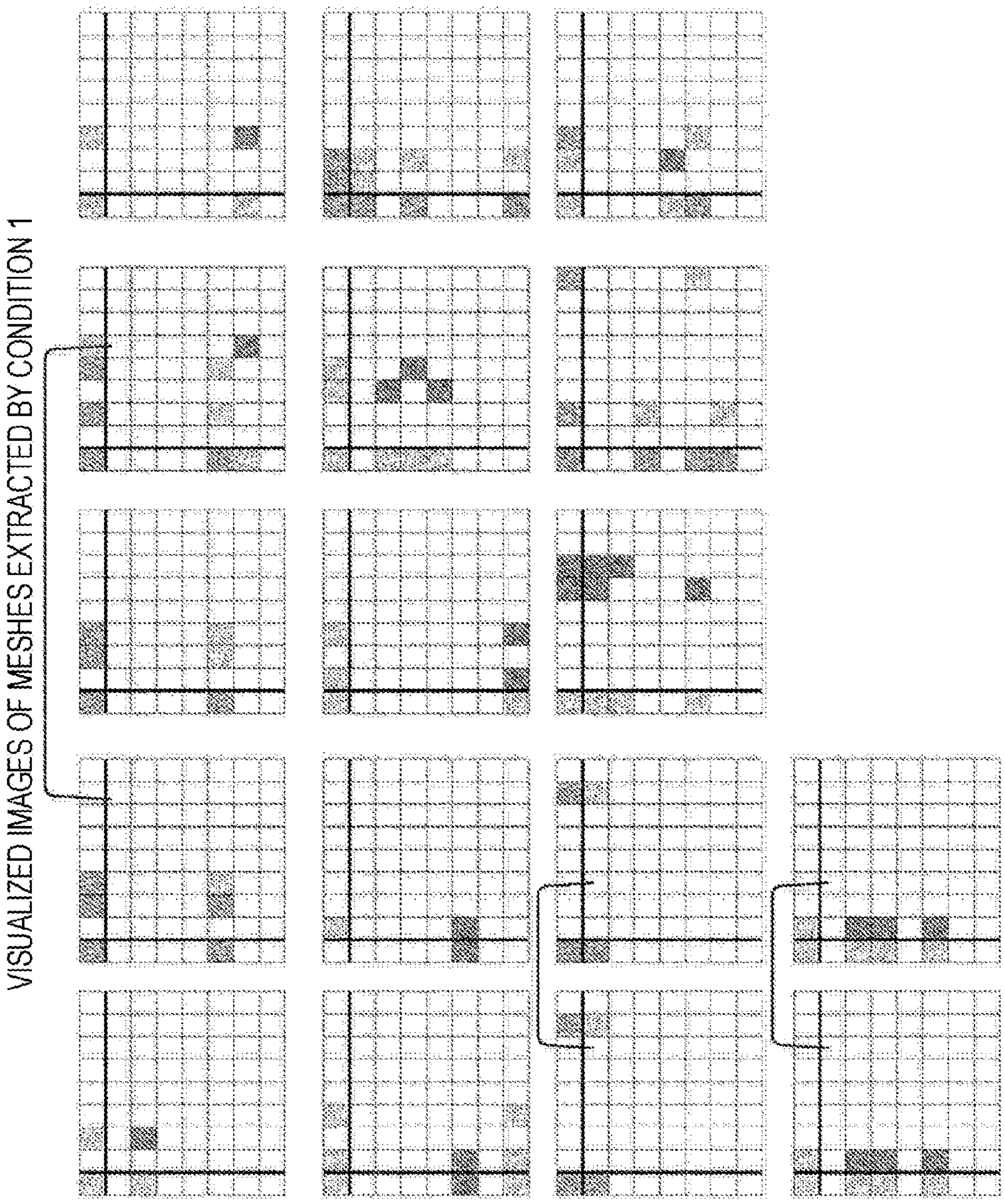
FIG. 10 is a diagram illustrating an example of list display of visualized images.
Figure 11:
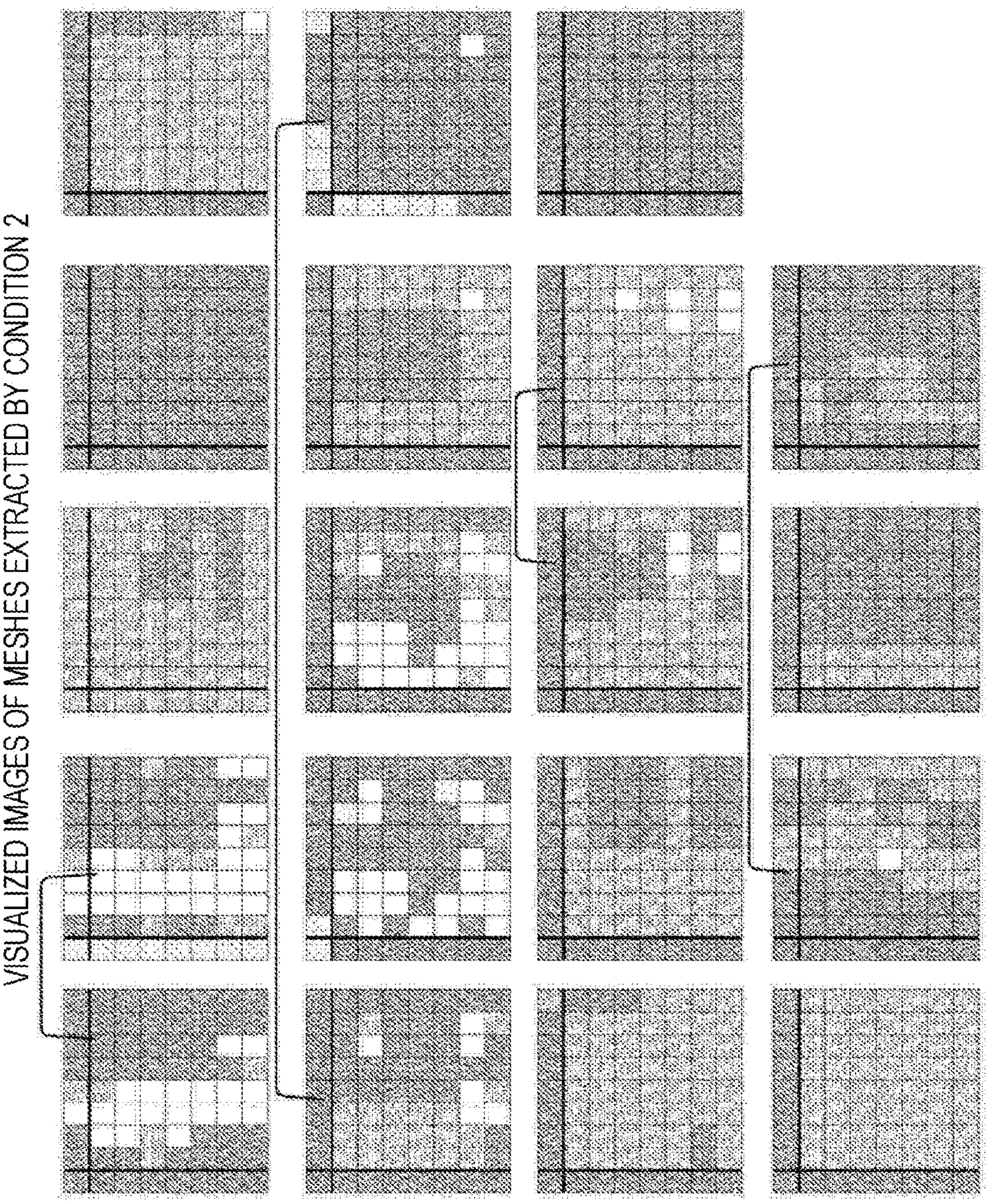
FIG. 11 is a diagram illustrating another example of list display of visualized images.
Figure 12:
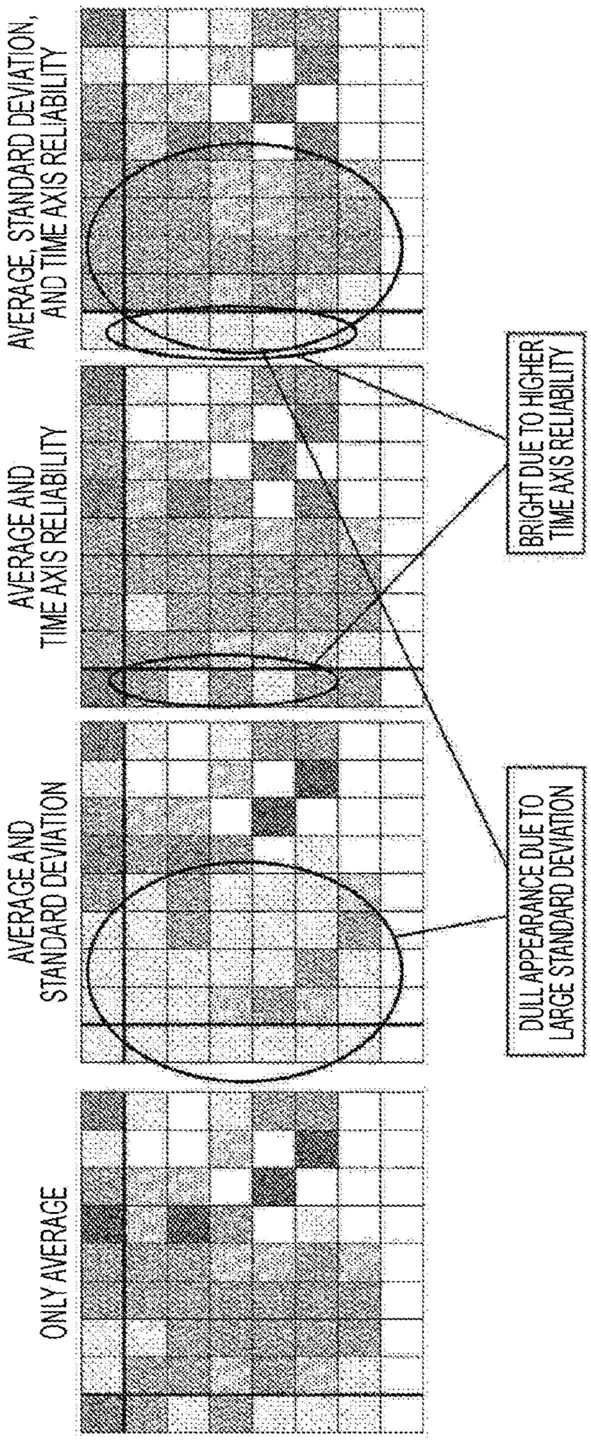
FIG. 12 is a diagram illustrating an example of switching display of visualized images.

As illustrated in FIG. 9, the control unit 26 may display the visualized image for each mesh by superimposing on the position of each mesh on the map. Furthermore, the control unit 26 is not limited to the case of displaying the visualized image by superimposing on the map, and as illustrated in FIGS. 10 and 11, visualized images of meshes extracted on the basis of a predetermined condition may be displayed by arranging in a list. In addition, as illustrated in FIG. 12, the control unit 26 may switch and display a visualized image representing only the average, a visualized image representing the average and the standard deviation, a visualized image representing the average and the time axis reliability, and a visualized image representing the average, the standard deviation, and the time axis reliability. For example, in a case of displaying the visualized image representing only the average, it is sufficient if the control unit 26 colors each cell with the color represented by the value of hue (H) specified from μ(T, t) and the value (for example, the maximum value of a predetermined range) of fixed saturation (S) and brightness (V).

Figure 13:
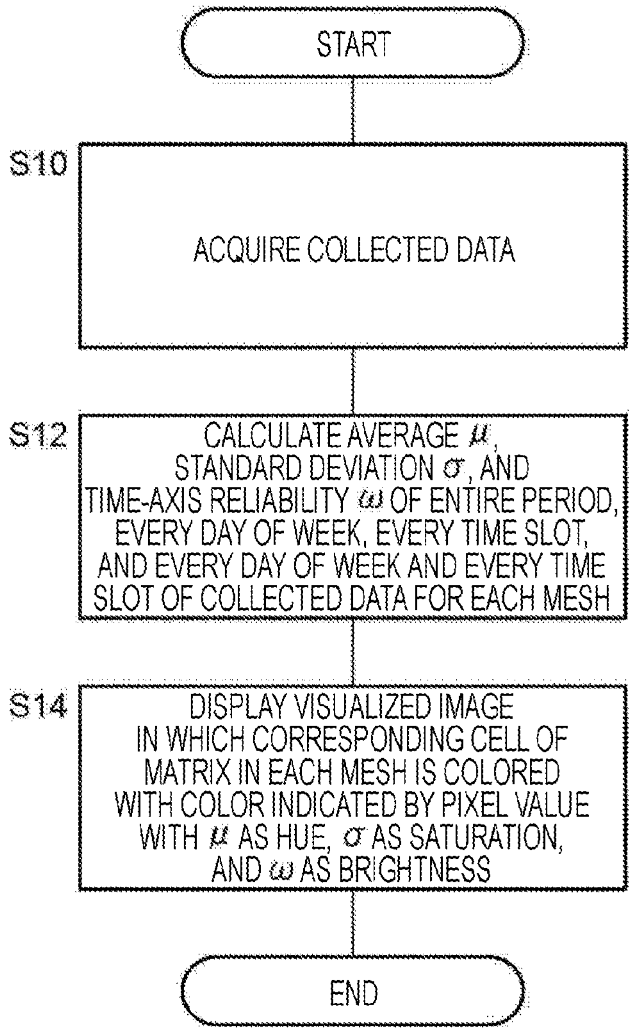
FIG. 13 is a flowchart illustrating an example of a display control process.

Next, operations of the display control device 10 will be described. FIG. 13 is a flowchart illustrating a flow of a display control process by the display control device 10. The display control process is performed by the CPU 11 reading the display control program from the ROM 12 or the storage 14, loading the display control program to the RAM 13, and executing the display control program. The display control process is an example of a display control method of the disclosed technology.

In step S10, the CPU 11, as the acquisition unit 22, acquires the collected data input to the display control device 10, and passes the acquired collected data to the calculation unit 24.

Next, in step S12, the CPU 11, as the calculation unit 24, aggregates the collected data by the aggregation unit t of each time axis for each time axis T of the entire period, every day of the week, every time slot, and every day of the week and time slot of the collected data for each mesh. Thus, the CPU 11, as the calculation unit 24, calculates each of the average μ(T, t), the standard deviation σ(T, t), and the time axis reliability ω(T, t). The calculation unit 24 delivers each of the calculated μ(T, t), σ(T, t), and ω(T, t) to the control unit 26.

Next, in step S14, the CPU 11, as the control unit 26, specifies the pixel value HSV(T, t) obtained by associating μ(T, t), σ(T, t), and ω(T, t) for each mesh delivered from the calculation unit 24 with hue (H), saturation (S), and brightness (V). Then, the CPU 11, as the control unit 26, divides each mesh into a matrix, and associates the time axis for every day of the week with one of a row and a column of the matrix and the time axis for every time slot with the other. Then, the CPU 11 displays, as the control unit 26, a visualized image in which each cell is colored with a color indicated by the pixel value HSV(T, t) according to the time axis corresponding to the row and column to which each cell belongs on the display unit 16, and the display control process ends.

As described above, the display control device according to the present embodiment acquires the collected data corresponding to the number of aggregation targets present, the collected data being collected in the predetermined time unit for each region obtained by virtually dividing the real space, and calculates each of the three different indexes from the collected data. Then, the display control device displays, on the display unit, a visualized image in which a pixel value obtained by associating the three calculated indexes with the three elements of the color space, respectively, is set as a pixel value indicating the region. Thus, a plurality of indexes can be visualized in a simultaneously comparable manner for spatially divided data.

In addition, the display control device uses the average, the standard deviation, and the reliability of aggregation thereof as the three indexes, and expresses them as one visualized image. By expressing the reliability of aggregation, it is possible to facilitate determination as to whether to take a measure based on the aggregation result so far, or to further perform data collection, aggregation, and the like.

Further, the display control device also expresses respective aggregation results on different time axes by one visualized image. Thus, the tendency of time-series data can be grasped from one visualized image without performing screen switching or the like. Further, by making different time axes correspond to the rows and columns of the matrix, the granularity of aggregation can be made finer than in a case where box plots are compared side by side, and the expression content of the aggregation result is enriched. Note that if the granularity of aggregation is too fine, for example, one minute or the like, the aggregation result lacks readability. In the present embodiment, by collectively handling aggregation results for a certain period and expressing the reliability and the standard deviation based on the number of times of aggregation instead, it is possible to easily grasp the tendency of the collected data for each time axis from one visualized image.

For example, the effects of the present embodiment will be specifically described in a case where the aggregation results regarding a traffic volume for each place is visualized as in the present embodiment. In the visualized image in which the hue is simply assigned to the average, even if the average is large, it is not possible to distinguish whether the traffic volume in the time slot is always large or whether the traffic volume is sometimes large and sometimes small due to large variation. For example, in a case where the average is 100, it is not possible to distinguish, only by the average, whether the number of vehicles is always 100 or whether the number of vehicles is sometimes one and sometimes 1000 even in the same time slot. As in the present embodiment, by assigning saturation to the standard deviation to express data variation, it is possible to express the standard deviation together with the average in one visualized image. Thus, it becomes easy to determine whether to apply congestion avoidance measures or to perform additional data collection and aggregation.

Further, the reliability of the average or the standard deviation is lower in a case where the average or the standard deviation is calculated from a small amount of data (for example, only 2 to 3 counts) as compared to a case where the average or the standard deviation is calculated from a rich amount of data (the number of times of aggregation). By assigning brightness to the reliability as in the present embodiment, it is possible to express the reliability together with the average and the standard deviation in one visualized image. As a result, in a case where the reliability of the aggregation result is low, it is possible to determine that it is necessary to perform additional data collection and aggregation.

More specifically, for a place where the average is large, the standard deviation is small, and the reliability is high, that is, a place where a highly confirmed aggregation result indicating that the place is always congested is obtained, it is possible to determine to take a steady congestion avoidance measure such as increasing the number of lanes. Further, for a place where the average is large, the standard deviation is large, and the reliability is high, additional data collection and aggregation are performed with finer time granularity, and a time slot of congestion is specified. Then, it is possible to determine to take, for the specified time slot, a temporary congestion avoidance measure such as adjusting a switching time of a traffic light or proposing a detour route for avoiding congestion by route guidance by a navigation system. In a case where the standard deviation is large even if the granularity is reduced, there may be a response such as performing only a temporary congestion avoidance measure such as a detour route, and not performing increasing the lane or adjusting the traffic light. Further, in a case where the reliability is low, it is possible to determine to perform additional data collection and aggregation until sufficient reliability is obtained.

Further, as illustrated in FIG. 9, in a case where visualized images are displayed in association with meshes on the map, visualized images of a plurality of meshes can be compared while considering the positional relationship in the real space.

For example, FIG. 9 is a map visualizing tendencies in meshes created in about 150 m square in Daiba, Minato-ku, Tokyo. It can be observed that congestion occurs only at a specific time in meshes away from intersections on a main road surrounded by solid lines. On the other hand, it is possible to observe a tendency that vehicles are concentrated and severe congestion occurs in many time slots in meshes near intersections of the main road surrounded by dotted lines, near the upper left straight road connecting Daiba and the Toyosu area, and near the foot of a bridge on the upper right connecting Daiba and the Tatsumi area. By simultaneously observing the map and the temporal tendency of the traffic volume change for each mesh, it is possible to observe the influence of geographical conditions such as a straight road, an intersection, and the foot of a bridge on the congestion tendency. In addition, it can also be observed that a portion where a plurality of adjacent meshes is simultaneously surrounded by dotted lines or solid lines has a similar congestion tendency between geographically close meshes.

Further, as illustrated in FIGS. 10 and 11, also in a case where a list of visualized images for a plurality of meshes extracted on the basis of some conditions is displayed, it is possible to easily compare the visualized images for a plurality of relevant meshes.

For example, FIG. 10 illustrates a list of extracted meshes (condition 1) that are congested only in a specific time slot or day of the week. The meshes corresponding to the visualized images included in FIG. 10 are the meshes represented by solid thick line frames among the meshes on the map illustrated in FIG. 9. From the display example of FIG. 10, for example, it is possible to confirm information that, among places where the average is large, that is, congestion occurs from midnight to the morning on a specific day of the week, many places are far from intersections, or the like. Further, FIG. 11 illustrates a list of extracted visualized images of meshes (condition 2) corresponding to places where the average over the entire period is equal to or more than a predetermined value, that is, places that are always crowded. The meshes corresponding to the visualized images included in FIG. 11 are the meshes represented by broken line frames among the meshes on the map illustrated in FIG. 9. From the display example of FIG. 11, for example, a place where the standard deviation is large or a place where the time axis reliability is low can be specified as a place where more detailed aggregation and analysis are necessary. Further, a place where the average is large, the standard deviation is small, and the time axis reliability is high can be specified as a place where a steady congestion avoidance measure needs to be taken.

Note that, in FIGS. 10 and 11, visualized images connected by lines indicate that the distance in the corresponding real space is short. In a case where a distance in the real space is short, more specifically, in a case where corresponding visualized images are similar between places where the meshes are adjacent on the map, it is possible to perform thinning of aggregation such as aggregating only one of the meshes in the future. By thinning the aggregation, it is possible to achieve an increase in speed and a reduction in cost of the entire processing. In addition, for example, in a case where aggregation of one of two meshes is thinned, it may be considered that the same aggregation result is obtained for the two meshes. In this case, when a visualized image is superimposed and displayed on a map, the visualized image may be displayed on one of the two meshes, or the visualized image may be displayed at an intermediate position between the two meshes.

That is, in the visualized image displayed according to the present embodiment, clustering of aggregation results can be performed while interweaving human knowledge, such as indicating that tendencies of the traffic volume are similar between places at close distances. Further, regarding clustering of aggregation results performed mechanically, by showing the similarity of statistical information and geographical tendencies together, for example, it is possible to expect an effect of accountability on the results, such as that a congestion measure is necessary since a straight road connecting places with a large traffic volume is intermittently congested. Further, unlike a result of machine learning discharged in a black box manner, it is possible to find features such as a short distance between places having similar traffic volume tendencies, or a similar distance from an intersection. Consequently, the appeal of a measure according to the content determined on the basis of the visualized image is increased, and it is easy to obtain an agreement of a person who is not accustomed to machine learning or a person who does not trust machine learning.

Furthermore, FIG. 12 is a display example of a visualized image for a mesh having a large standard deviation in a time slot from midnight to the morning and a large time axis reliability for every day of the week on weekdays. As described above, FIG. 12 illustrates, in order from the left, a visualized image representing only the average, a visualized image representing the average and the standard deviation, a visualized image representing the average and the time axis reliability, and a visualized image representing the average, the standard deviation, and the time axis reliability. Even in cells in colors of substantially the same hue (H) (for example, greenish colors) with an equivalent average of the number of vehicles, a portion having a large standard deviation has a small saturation (S) and is displayed dull. Further, the time slot from the afternoon to the night indicates that there is a time slot in which the number of vehicles varies less and there is a locally crowded time slot. Furthermore, the time slot from midnight to the morning from Monday to Saturday has a large variation in the number of vehicles, indicating that congestion does not occur at all on Sunday, and it can be seen that the degree of congestion is greatly different between Sunday and other days of the week.

On the basis of the content that can be grasped from the visualized image as described above, for example, it is possible to make a determination such as taking a steady congestion avoidance measure, taking a temporary congestion avoidance measure only in a crowded time slot, and performing additional data collection and aggregation.

Furthermore, the comparison of visualized images is not limited to a case of comparing locations (meshes) with each other, and display may be performed so that visualized images of the same location, for example, visualized images before and after application of the congestion avoidance measure are compared.

As a conventional technology, for example, there is a technology of displaying different indexes on the same screen while expressing a tendency by time by animation in association with different layers, like a 3D map function in Excel (registered trademark) of Microsoft Corporation. In such a conventional technique, since the indexes are not associated with each other, it is necessary to check each index by switching layers or the like, which lacks perspicuity. Furthermore, in a case of displaying the tendency by time of data in animation, there is a problem that it is difficult to find an interesting moment during the animation and pause the animation, or it is difficult to compare values at different times. On the other hand, in the display control device according to the present embodiment, since the relationship between the indexes and the tendency of the indexes by time are displayed on the same screen, the relationship between the indexes and the tendency of the indexes by time can be grasped without switching the layers or pausing the animation, or the like.

Further, in order to distinguish each piece of data, there is also a visualizing method of assigning a color to each piece of data and displaying an icon representing each of a plurality of pieces of data by the assigned color on the same screen. For example, as in Reference Literature 1 below, there is a technology in which feature amounts of music are assigned to three axes of a color space, and each of a plurality of pieces of music included in a playlist is expressed by a color. Furthermore, as in Reference Literature 2 below, there is a technology of visually expressing a transition of an event that is a topic on social media by assigning a hue according to each event.

Reference Literature 1: Tomoshi Uota, Takayuki Itoh, "GRAPE: A music playlist visualization technique featuring gradation images", DEIM Forum 2012 C3-2, 2012

Reference Literature 2: Kazuo Misue, "Visualization of Social Data with Timestamps", visualized information, Vol. 36 No. 141, April 2016

The conventional technique as described above is a visualizing method capable of increasing variations of icons representing each piece of data and making it easy to distinguish each piece of data. However, in these visualization methods, simultaneous comparison of a plurality of indexes and their temporal tendencies for spatially divided data is not considered. On the other hand, with the display control device according to the present embodiment, it is possible to simultaneously compare a plurality of indexes and time-dependent tendencies thereof for spatially divided data.

Note that, in the above embodiment, the case where the disclosed technology is applied to the use case in which aggregation results regarding the traffic volume for each place are visualized has been described as an example, but the disclosed technology is also applicable to other use cases. For example, the disclosed technology is also applicable to a use case in which demographic data for each place is visualized and used for city planning and congestion prediction, and a use case in which energy consumption is visualized and used for air conditioning optimization. Further, the disclosed technology can be applied as long as the number, that is, the density in every region can be handled. For example, the disclosed technology can also be applied to a case where the flow rate of fish in each region of a sea area, the number of features existing in each region, the transmission amount of data in a network, and the like are targeted, and a plurality of indexes that is aggregation results thereof is visualized on the same screen.

Note that, in the above embodiment, operations such as enlargement, reduction, and translation of the visualized image may be accepted. In addition, clustering results of visualized images having similar tendencies may be displayed. The clustering of the visualized images may use similarity of a pixel value HSV(T, t) included in the visualized images, or may use a model trained by the user by assigning a label to each visualized image. In addition, for the selected mesh, the visualized image as in the above embodiment may be displayed, and animation drawing of the change in the number of vehicles in a collection unit (10 minutes in the example of the above embodiment) may be displayed.

Note that the display control process executed by the CPU reading software (program) in the above embodiment may be executed by various processors other than the CPU. Examples of the processors in this case include a programmable logic device (PLD) of which a circuit configuration can be changed after the manufacturing, such as a field-programmable gate array (FPGA), and a dedicated electric circuit that is a processor having a circuit configuration exclusively designed for executing a specific process, such as an application specific integrated circuit (ASIC). In addition, the display control process may be performed by one of these various processors, or may be performed by a combination of two or more processors of the same type or different types (for example, a plurality of FPGAs, a combination of a CPU and an FPGA, and the like). Furthermore, a hardware structure of the various processors is, more specifically, an electric circuit in which circuit elements such as semiconductor elements are combined.

Further, in each of the above embodiments, the aspect in which the display control processing program is stored (installed) in advance in the ROM 12 or the storage 14 has been described, but this is not restrictive. The program may be provided in the form of a program stored in a non-transitory storage medium such as a compact disk read only memory (CD-ROM), a digital versatile disk read only memory (DVD-ROM), or a universal serial bus (USB) memory. In addition, the program may be downloaded from an external device via a network.

Regarding the above embodiments, the following supplementary items are further disclosed.

(Supplementary Item 1)

A display control device, including:

a memory; and at least one processor connected to the memory, in which the processor is configured to acquire a value corresponding to a number of aggregation targets present, the number being collected in a predetermined time unit for each of regions obtained by virtually dividing a real space, calculate each of three different indexes from the value acquired, and display, on a display unit, a visualized image in which a pixel value obtained by associating the three indexes calculated with three elements of a color space, respectively, is set as a pixel value indicating the region.

(Supplementary Item 2)

A non-transitory recording medium storing a program that is executable by a computer to execute a display control process, in which the display control process includes acquiring a value corresponding to a number of aggregation targets present, the number being collected in a predetermined time unit for each of regions obtained by virtually dividing a real space, calculating each of three different indexes from the value acquired, and displaying, on a display unit, a visualized image in which a pixel value obtained by associating the three indexes calculated with three elements of a color space, respectively, is set as a pixel value indicating the region.

REFERENCE SIGNS LIST

10 Display control device
11 CPU
12 ROM
13 RAM
14 Storage
15 Input unit
16 Display unit
17 Communication I/F

19 Bus
22 Acquisition unit
24 Calculation unit
26 Control unit

The invention claimed is:

1. A display control device, comprising:
a memory; and
at least one processor coupled to the memory, wherein the at least one processor is configured to:
acquire a value corresponding to a number of aggregation targets that are present, the number being collected in a predetermined time unit for each of a plurality of regions obtained by virtually dividing a real space;
calculate each of three different indexes from the value acquired; and
display, on a display unit, a visualized image in which a pixel value obtained by associating the three indexes with three elements of a color space, respectively, is set as a pixel value indicating the region,
wherein, the calculate operation further comprises calculating, as the three indexes, a first statistic, a second statistic, and a reliability of at least one of the first statistic or the second statistic.

2. The display control device according to claim 1, wherein the at least one processor is further configured to:
set the pixel value as the pixel value including hue according to the first statistic, saturation according to the second statistic, and brightness according to the reliability.

3. The display control device according to claim 2, wherein the at least one processor is further configured to increase the brightness as the reliability becomes higher.

4. The display control device according to claim 2, wherein the reliability is an index representing a relative value of a number of times of aggregation of the number collected in the predetermined time unit.

5. The display control device according to claim 1, wherein the at least one processor is further configured to:
calculate the three indexes for each of a plurality of different granularities by aggregating the value for each of the granularities, and
divide an inside of the region into a plurality of small regions, and display pixel values corresponding to the three indexes for each of the granularities as pixel values indicating the small regions corresponding to each of the granularities.

6. The display control device according to claim 5, wherein the at least one processor is further configured to:
calculate the three indexes for each of the granularities by aggregating the value for each of the granularities for an entire period, every day of week, every time slot, and every day of week and time slot in which the number is collected, and
divide the region into small regions in a matrix, associate one of a row or a column of the matrix with the day of week and the other of the row or the column with the time slot, and display, as pixel values indicating the small regions, pixel values corresponding to the three indexes of a granularity according to the row and the column to which the small regions belong.

7. A display control method, comprising, by a computer:
acquiring a value corresponding to a number of aggregation targets that are present, the number being collected in a predetermined time unit for each of a plurality of regions obtained by virtually dividing a real space;
calculating each of three different indexes from the value acquired; and
displaying, on a display unit, a visualized image in which a pixel value obtained by associating the three indexes with three elements of a color space, respectively, is set as a pixel value indicating the region,
wherein, the calculating further comprises calculating, as the three indexes, a first statistic, a second statistic, and a reliability of at least one of the first statistic or the second statistic.

8. A non-transitory computer readable medium storing a program executable by a computer to perform display control processing, the display control processing comprising:
acquiring a value corresponding to a number of aggregation targets that are present, the number being collected in a predetermined time unit for each of a plurality of regions obtained by virtually dividing a real space;
calculating each of three different indexes from the value acquired; and
displaying, on a display unit, a visualized image in which a pixel value obtained by associating the three indexes with three elements of a color space, respectively, is set as a pixel value indicating the region,
wherein, the calculating further comprises calculating, as the three indexes, a first statistic, a second statistic, and a reliability of at least one of the first statistic or the second statistic.

* * * * *